US 6,528,198 B1

(12) United States Patent
Jones et al.

(10) Patent No.: US 6,528,198 B1
(45) Date of Patent: Mar. 4, 2003

(54) FUEL CELL MEMBRANE HYDRATION AND FLUID METERING

(75) Inventors: Daniel O. Jones, Glenville, NY (US); Michael M. Walsh, Fairfield, CT (US)

(73) Assignee: Plug Power, Inc., Latham, NY (US)

( * ) Notice: Subject to any disclaimer, the term of this patent is extended or adjusted under 35 U.S.C. 154(b) by 0 days.

(21) Appl. No.: 09/416,705

(22) Filed: Oct. 12, 1999

Related U.S. Application Data

(62) Division of application No. 08/899,262, filed on Jul. 23, 1997, now Pat. No. 5,998,054.

(51) Int. Cl.$^7$ .......................... H01M 8/02; H01M 8/04; H01M 8/10
(52) U.S. Cl. ........................ 429/38; 429/30; 429/34; 429/39
(58) Field of Search ................... 429/30, 34, 38, 429/39

(56) References Cited

U.S. PATENT DOCUMENTS

| 4,328,287 | A | | 5/1982 | Sammells et al. ............ 429/15 |
|---|---|---|---|---|
| 4,769,297 | A | | 9/1988 | Reiser et al. ................. 429/17 |
| 4,788,110 | A | | 11/1988 | Bernard ........................ 429/19 |
| 4,818,637 | A | | 4/1989 | Molter et al. ................. 429/15 |
| 5,104,497 | A | | 4/1992 | Tetzlaff et al. ............ 204/59 R |
| 5,234,776 | A | | 8/1993 | Koseki ......................... 429/30 |
| 5,262,249 | A | | 11/1993 | Beal et al. .................... 429/26 |
| 5,344,721 | A | | 9/1994 | Sonai et al. .................. 429/20 |
| 5,382,478 | A | | 1/1995 | Chow et al. .................. 429/26 |
| 5,432,021 | A | * | 7/1995 | Wilkinson et al. ........... 429/17 |
| 5,478,662 | A | | 12/1995 | Strasser ........................ 429/13 |
| 5,482,680 | A | * | 1/1996 | Wilkinson et al. ........ 429/34 X |
| 5,503,945 | A | | 4/1996 | Petri et al. .................... 429/35 |
| 5,514,487 | A | | 5/1996 | Washington et al. ......... 429/39 |
| 5,543,238 | A | | 8/1996 | Strasser ........................ 429/17 |
| 5,547,777 | A | | 8/1996 | Richards ...................... 429/32 |
| 5,750,281 | A | | 5/1998 | Washington et al. ......... 429/39 |
| 5,766,786 | A | | 6/1998 | Fleck et al. ................... 429/17 |
| 5,773,160 | A | | 6/1998 | Wilkinson et al. ............ 429/13 |
| 6,017,648 | A | * | 1/2000 | Jones ........................... 429/35 |

FOREIGN PATENT DOCUMENTS

| DE | 196 41 143 | 4/1997 | |
|---|---|---|---|
| FR | 2 017 166 | 5/1970 | |
| JP | 58-169778 A | 10/1983 | ............ H01M/8/04 |
| JP | 04 095357 | 3/1992 | |
| JP | 06 267560 | 9/1994 | |
| JP | 07 220746 | 8/1995 | |
| JP | 08 250130 | 9/1996 | |

OTHER PUBLICATIONS

Database WPI, Derwent Publications Ltd., London, GB; AN 96–270886, XP–002072973 Relates to JP 07–220746; 8/95.
Chemical Abstracts, vol. 123, No. 24, Dec. 11, 1995, Columbus, Ohio, Tani et al: "Solid Polymer Electrolyte Fuel Cells" XP002072972 Relates to JP 07–220746.
Journal of the Electrochemical Society, Aug. 1993, No. 8, Manchester, NH, "A Water and Heat Management Model for Proton–Exchange–Membrane Fuel Cells", Nguyen and White, pp. 2178–2186.

* cited by examiner

Primary Examiner—Gabrielle Brouillette
Assistant Examiner—Jonathan Crepeau
(74) Attorney, Agent, or Firm—Heslin Rothenberg Farley & Mesiti, P.C.

(57) ABSTRACT

A hydration system includes fuel cell fluid flow plate(s) and injection port(s). Each plate has flow channel(s) with respective inlet(s) for receiving respective portion(s) of a given stream of reactant fluid for a fuel cell. Each injection port injects a portion of liquid water directly into its respective flow channel. This serves to hydrate at least corresponding part(s) of a given membrane of the corresponding fuel cell(s). The hydration system may be augmented by a metering system including flow regulator(s). Each flow regulator meters an injecting at inlet(s) of each plate of respective portions of liquid into respective portion(s) of a given stream of fluid by corresponding injection port(s).

9 Claims, 4 Drawing Sheets

FUEL CELL MEMBRANE HYDRATION AND FLUID METERING

This application is a division of U.S. patent application Ser. No. 08/899,262, filed Jul. 23, 1997, now U.S. Pat. No. 5,998,054.

STATEMENT OF GOVERNMENT RIGHTS

The Government of the United States of America has rights in this invention pursuant to Contract No. DE-AC02-94CE50389 awarded by the U.S. Department of Energy.

TECHNICAL FIELD

This invention relates, generally, to fuel cell assemblies and, more particularly, to membrane hydration and fluid metering in fuel cells.

BACKGROUND ART

A Proton Exchange Membrane ("PEM") fuel cell converts the chemical energy of fuels such as hydrogen and oxidizers such as air/oxygen directly into electrical energy. The PEM is a solid polymer electrolyte that permits the passage of protons ($H^+$ ions) from the "anode" side of a fuel cell to the "cathode" side of the fuel cell while preventing passage therethrough of the hydrogen and air/oxygen gases. Some artisans consider the acronym "PEM" to represent "Polymer Electrolyte Membrane." The direction, from anode to cathode, of flow of protons serves as the basis for labeling an "anode" side and a "cathode" side of every layer in the fuel cell, and in the fuel cell assembly or stack.

For instance, the PEM can be made using a polymer such as the material manufactured by E. I. Du Pont De Nemours Company and sold under the trademark NAFION®. Further, an active electrolyte such as sulfonic acid groups is included in this polymer. Also, the PEM is available as a product manufactured by W. L. Gore & Associates (Elkton, Md.) and sold under the trademark GORE-SELECT®. Moreover, a catalyst such as platinum which facilitates chemical reactions is applied to each side of the PEM. This unit is commonly referred to as a membrane electrode assembly ("MEA"). The MEA is available as a product manufactured by W. L. Gore & Associates and sold under the trade designation PRIMEA 5510-HS.

An individual fuel cell generally has multiple, transversely extending layers assembled in a longitudinal direction. In the fuel cell assembly or stack, all layers that extend to the periphery of the fuel cells have holes therethrough for alignment and formation of fluid manifolds. Further, gaskets seal these holes and cooperate with the longitudinal extents of the layers for completion of the fluid manifolds. As is well-known in the art, some of the fluid manifolds distribute fuel (e.g., hydrogen) and oxidizer (e.g., air/oxygen) to, and remove unused fuel and oxidizer as well as product water from, fluid flow plates of each fuel cell. Furthermore, other fluid manifolds circulate water for cooling.

As is well-known in the art, the PEM can work more effectively if it is wet. Conversely, once any area of the PEM dries out, the fuel cell does not generate any product water in that area because the electrochemical reaction there stops. Undesirably, this drying out can progressively march across the PEM until the fuel cell fails completely.

Traditionally, attempts have been made to introduce water into the PEM by raising the humidity of the incoming reactant gases. That is, the fuel and oxidizer gases are often humidified with water vapor before entering the fluid manifolds in order to convey water vapor for humidification of the PEM of the fuel cell.

However, problems can result from the use of water vapor in humidification of the reactant gases. For example, significant quantities of heat are required in order to saturate the reactant gas stream at a temperature close to the temperature of the fuel cell. In particular, one cannot just employ waste heat from a cell cooling circuit, because the temperature will necessarily be lower than the cell temperature. Furthermore, temperature variations within the reactant gas manifolds and fuel cell plate channels can undesirably lead to condensation of the vapor and poor distribution of the reactant gas and vapor/water.

Moreover, vapor distribution is unpredictable. So, despite the introduction of water vapor into the gas stream at the inlet of a longitudinal fluid manifold, drying out of the PEMs can still occur. These drying problems of the fuel cell assembly can become severe at high power levels.

Deleterious effects can also result from turns in the flow path of a stream which is a mixture of water droplets and reactant gas. After the stream goes around a given curve, separation of the water from the reactant gas occurs. Anytime the stream changes direction and/or velocity, the various settling rates yield -separation. Therefore, by the time the stream reaches the end of such a flow path, most of the liquid will have settled out. Similar problems and unpredictability can result in any unconstrained flow of water mixed with reactant gas.

Naturally, fuel cells within the same assembly or stack can have varying efficiencies. In particular, some fuel cells generate more heat than others. A fuel cell running hot will require more water in order to function. If a fuel cell assembly delivers inadequate moisture to a given fuel cell, then the PEM of that fuel cell begins to dry out, which causes it to run hotter still since the remaining fuel cells in the assembly continue to force high current therethrough. When the PEM of a fuel cell completely dries out, that fuel cell begins to dry out any adjacent fuel cells. Accordingly, it is desirable to deliver water to all the fuel cells in the stack.

Additional problems stem from height variations in different areas of an individual fuel cell and the fuel cell assembly. For example, one can consider a fuel cell assembly that is angled and sloping upward from its entry end of a longitudinal reactant fluid supply manifold. There, the mere injection of water at the entry of the manifold into the fuel cell assembly would undesirably result in fuel cells on the low end receiving all water and no gas ("PEM flooding"), and fuel cells on the high end receiving all gas and no water ("PEM starvation").

In one prior art attempt to address some of the problems outlined above, a system is designed so various waters cool the fuel cells in a stack and hydrate their respective PEMs. A hydrogen gas stream is delivered to each anode plate. Injection ports from a water line mix liquid water into a given hydrogen gas stream before it arrives at an anode plate. The number of injection ports determines the amount of water injected into the gas stream, which thereafter flows to the anode plate. Nevertheless, there is no guarantee that every flow channel of the anode plate will obtain from the humidified gas stream adequate water for hydration of its part of the PEM. Furthermore, the possibility of uneven delivery of water among flow channels represents a potential waste in the system. Such a design is disclosed in U.S. Pat. No. 4,769,297 to Reiser et al. (entitled "Solid Polymer Electrolyte Fuel Cell Stack Water Management System," issued Sep. 6, 1988, and assigned to International Fuel Cells Corporation).

Thus, a need exists for ensuring effective, efficient, and continuous supply of water to all active areas of a membrane of an individual fuel cell. A further need exists for ensuring all active areas of each membrane in a working section of a fuel cell assembly effectively and efficiently receive adequate water.

SUMMARY OF THE INVENTION

Pursuant to the present invention, the shortcomings of the prior art are overcome and additional advantages provided through the provision of injection ports which hydrate a fuel cell membrane by directly injecting liquid water into reactant fluid at inlet(s) of fuel cell plate channel(s). Furthermore, a flow regulator at a metering area distributes liquid water essentially evenly to multiple flow channels uniformly over the volume of the fuel cell assembly.

According to the present invention, a hydration system can include a flow field plate or fuel cell fluid flow plate and an injection port. The plate has a flow channel with an inlet for receiving a portion of a stream of reactant fluid for a fuel cell. The injection port is in fluid communication with the flow channel. In particular, the injection port injects a portion of liquid water directly into the flow channel in order to mix the portion of liquid water with the portion of the stream. This serves to hydrate at least a part of a membrane of the fuel cell. Further, the injection port can inject the portion of liquid water into the inlet of the flow channel. The fuel cell can be a PEM-type fuel cell.

The plate can have a plurality of flow channels with respective inlets for receiving respective portions of the stream of the reactant fluid. In addition, a plurality of respective injection ports in fluid communication with these flow channels can inject respective portions of the liquid water directly thereinto for mixing with the respective portions of the stream. This serves to hydrate at least respective parts of the membrane of the fuel cell.

In another aspect of the invention, a hydration system can include a fuel cell fluid flow plate and first and second injection ports. The plate has first and second flow channels with respective first and second inlets for receiving respective first and second portions of a stream-of reactant fluid for a fuel cell. Moreover, the first and second injection ports are positioned at the respective first and second inlets for injecting respective first and second portions of liquid water into the respective first and second portions of the stream. This serves to hydrate at least respective first and second parts of a membrane of the fuel cell.

The first and second injection ports can inject the respective first and second portions of the liquid water directly into the respective first and second flow channels.

In another embodiment of the present invention, a metering system includes a fuel cell fluid flow plate, an injection port, and a flow regulator. The plate has a flow channel with an inlet for receiving a portion of a stream of fluid for a fuel cell. The injection port is positioned at the inlet for injecting a portion of liquid into the portion of the stream. The flow regulator meters the injecting of the portion of the liquid into the portion of the stream. The flow regulator can employ orifice metering. In addition, the flow regulator can include a porous block.

The plate can have a plurality of flow channels with respective inlets for receiving respective portions of the stream of the fluid. Further, a plurality of respective injection ports positioned at these inlets can inject respective portions of the liquid into the respective portions of the stream. Moreover, the flow regulator can also serve to meter the respective portions of the liquid to be substantially equal in amount. The flow regulator can further serve to meter the injecting of the respective portions of the liquid into the respective portions of the stream. Where this liquid is liquid water, the metering can serve to hydrate at least respective parts of a membrane of the fuel cell.

In yet another aspect of the present invention, at least some of a plurality of fuel cell fluid flow plates can have one or more flow channels with inlets thereon for receiving respective portions of respective streams of fluid. Plus, respective injection ports can be positioned at these inlets for injecting respective portions of liquid into the respective portions of the fluid. Finally, respective flow regulators can meter the injecting of the respective portions of the liquid into the respective portions of the fluid. A number of these plates can form multiple fuel cells. Moreover, the respective flow regulators can distribute the liquid substantially uniformly among the fuel cells.

The invention further contemplates a method for providing metering of liquid for a fuel cell. A plurality of portions of the liquid are injected into respective portions of a stream of fluid received by respective flow channels of the fuel cell. These injected portions of the liquid are metered to be substantially equal in amount.

Thus, the present invention advantageously provides direct injection and hydraulic metering of liquid water at the fuel cell plate inlet(s) of each fuel cell reactant gas stream in order to achieve adequate fuel cell membrane hydration and approximately equal flow in each channel of each plate, substantially uniformly in the assembly or stack.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

BEST MODE FOR CARRYING OUT THE INVENTION

In accordance with the principles of the present invention, a fuel cell assembly is provided in which injection ports directly inject approximately equal amounts of liquid water into inlets of flow plate channels carrying reactant fluid for each fuel cell. Further, a flow regulator ensures substantially uniform metering of adequate water for hydration of all active areas of each membrane in the fuel cell assembly.

Figure 1:
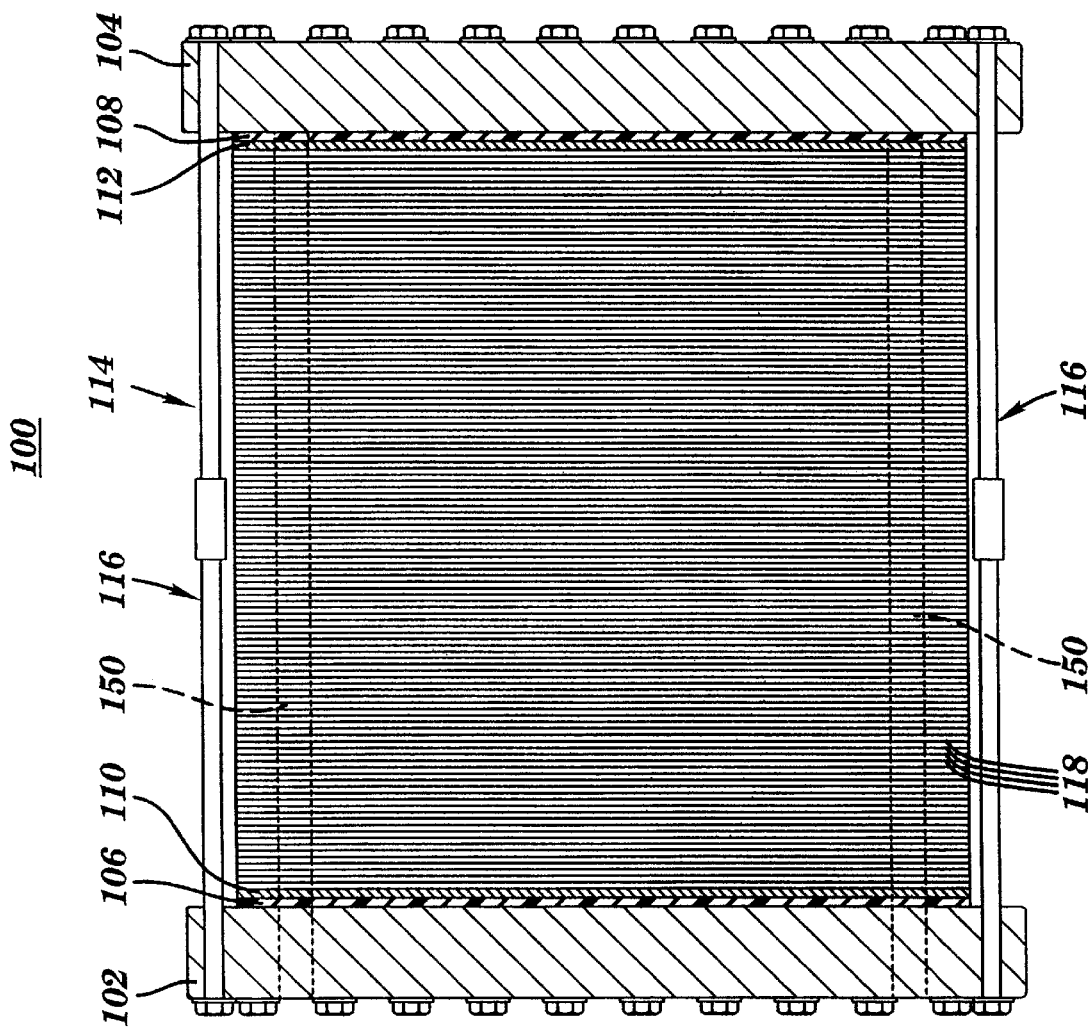
FIG. 1 is a front, sectional elevation view of one example of a fuel cell assembly incorporating and using the membrane hydration and fluid metering system of the present invention.

One example of a fuel cell assembly incorporating and using the novel features of the present invention is depicted in FIG. 1 and described in detail herein.

In this exemplary embodiment, a fuel cell assembly 100 includes end plates 102 and 104, insulation layers 106 and 108, and current collector plates 110 and 112, with a working section 114 therebetween, as will be understood by those skilled in the art. Further, a number of structural members 116 join the end plates, as is well-known in the art.

Working section 114 includes a number of layers 118. The layers generally form fluid manifolds 150 for supplying fluids to and removing fluids from the working section, as will be understood by those skilled in the art. Preferably, a plurality of the layers form one or more (e.g., one hundred and eight) PEM-type fuel cells. The construction and utilization of such fuel cells is known in the art.

In a typical PEM-type fuel cell, the PEM is sandwiched between "anode" and "cathode" gas diffusion layers (not shown) that can be formed from a resilient and conductive material such as carbon fabric. The anode and cathode gas diffusion layers are sometimes referred to as "electrodes." In particular, the anode and cathode gas diffusion layers serve as electrochemical conductors between catalyzed sites of the PEM and the hydrogen and air/oxygen which flow in respective "anode" and "cathode" fluid flow plates.

By connecting an external load (not shown) between electrical contacts (not shown) of current collector plates 110 and 112, one can complete a circuit for use of current generated by the one or more PEM-type fuel cells.

Figure 2:
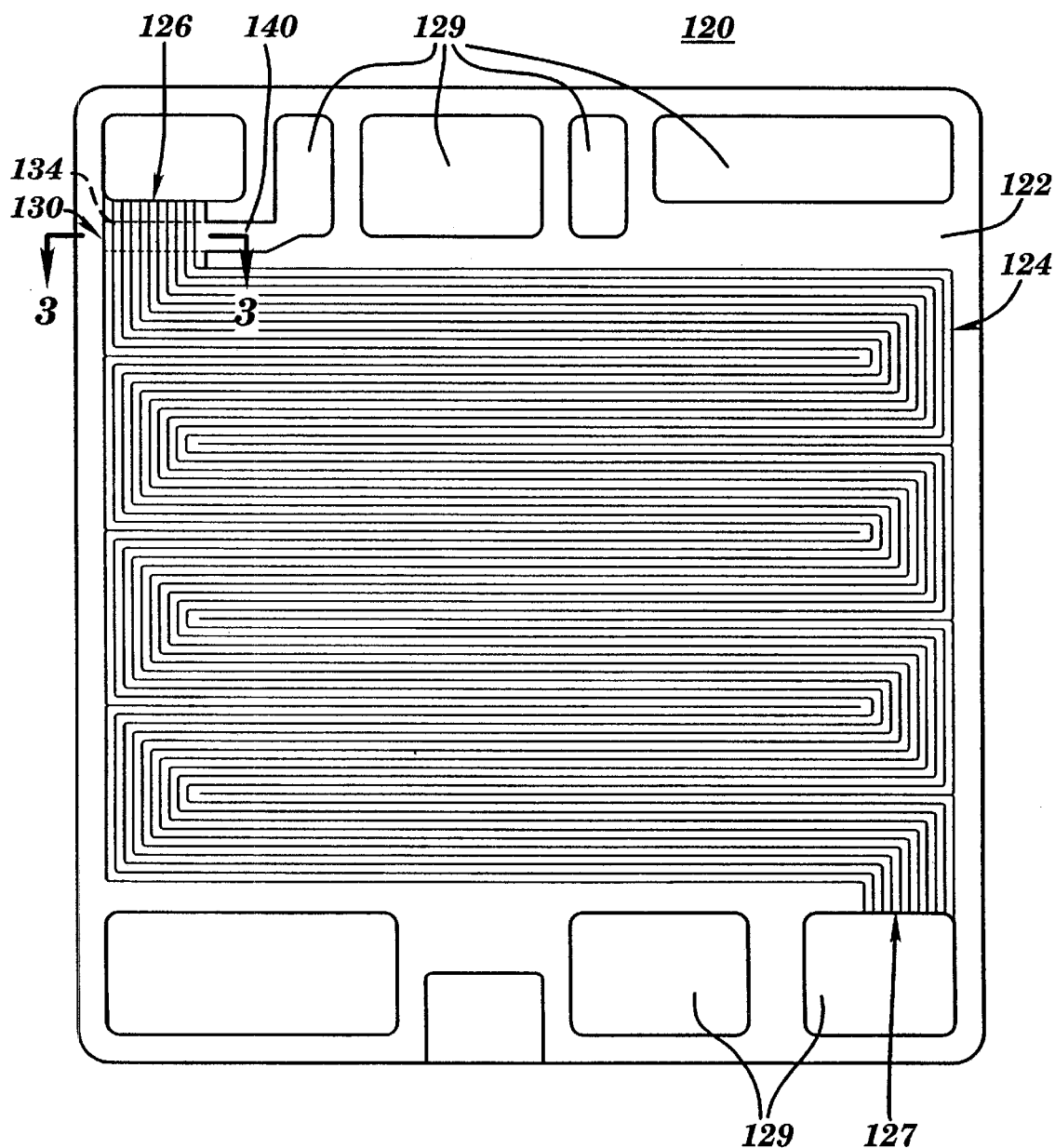
FIG. 2 is a plan view of an interior face of one example of a fluid flow plate in a fuel cell of the assembly of FIG. 1.

One example of a layer 118 of working section 114 is depicted in FIG. 2 as flow field plate or fuel cell fluid flow plate 120. The fluid flow plate has a face 122 with a number of parallel, serpentine flow channels 124 that include respective inlets 126 and outlets 127. Further, the fluid flow plate has a number of peripheral holes 129 therethrough, which can cooperate in formation of the fluid manifolds of the fuel cell assembly.

Fluid flow plate 120 can be formed from a conductive material such as graphite. For exemplary purposes, FIG. 2 illustrates face 122 as having ten flow channels 124. The flow channels are typically formed on the fade of the fluid flow plate by machining. As will be understood by those skilled in the art, fluid flow plate 120 may be a bipolar, monopolar, anode cooler, or-cathode cooler plate. Further, face 122 is an anode side or cathode side of the fluid flow plate. Moreover, the flow channels carry an appropriate reactant fluid (e.g., hydrogen or air/oxygen). A typical fluid flow plate 120 might have dimensions of 9.5 in. height, 8.0 in. width, and 0.06 in. thickness. Also, each flow channel 124 on face 122 might have cross-sectional dimensions of 0.06 in. width and 0.025 in. depth.

A flow regulator at metering area 130 for each fluid flow plate 120 is proximate inlets 126, as described below. The metering area can be positioned at a selected corner of the fluid flow plate.

Figure 3:
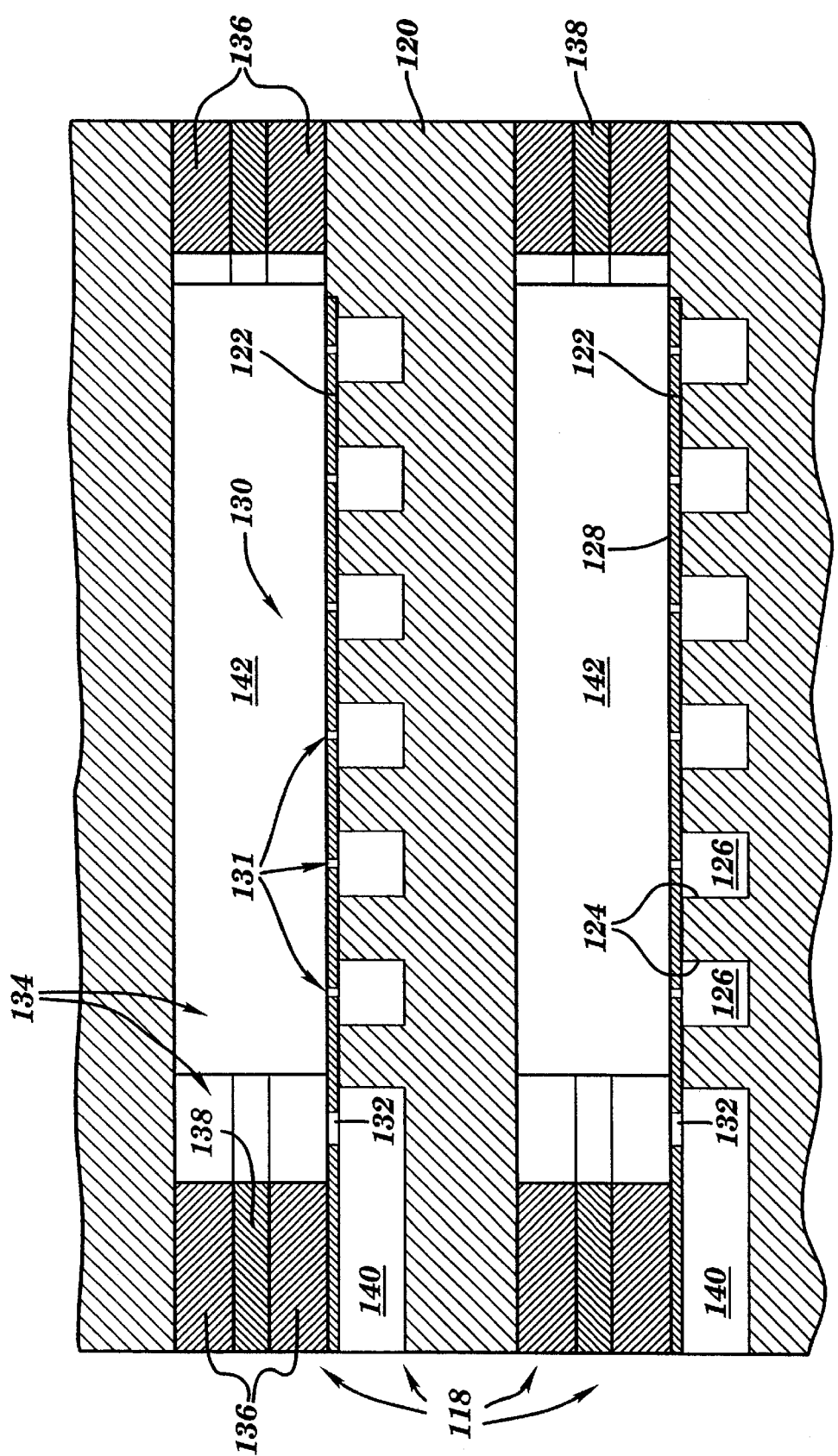
FIG. 3 is a cutaway side view of multiple fluid flow plate(s) in stacked fuel cells as viewed along direction 3—3 of FIG. 2, depicting a flow regulator feature of the present invention.

FIG. 3 depicts multiple instances of fluid flow plate 120 in fuel cell assembly 100. For exemplary purposes, FIG. 3 illustrates each fluid flow plate as having six inlets 126 of six corresponding flow channels 124 on its face 122.

A bridge or cover plate 128 extends along face 122 and across inlets 126, defining one opening or injection port 131 for each inlet 126 in addition to an input orifice 132. The injection ports provide fluid communication between the inlets and a transverse channel 134 for each fluid flow plate 120. Preferably, the injection ports are of substantially equal size.

For example, cover plate 128 can be formed from stainless steel foil. In particular, the cover plate can be shaped by laser cutting or through photoetching. Additionally, injection port 131 can be made circular with a diameter of 0.005 to 0.010 in., depending on such factors as desired water injection rates. For instance, a given injection port can be formed by laser cutting. Also, input orifice 132 can be made circular with a diameter of 0.005 to 0.020 in., depending on such factors as water injection rates and the number of injection ports downstream therefrom. Further, a given input orifice can be formed by laser cutting. Alternatively, a given input orifice can include multiple, relatively smaller input orifices which are sized and positioned to provide any desired flow restriction.

Transverse channel 134 is bounded on its sides at metering area 130 by a section cut out of the remainder of the corresponding transverse layer 118 in fuel cell assembly 100. Preferably, the remainder of this layer includes gaskets 136 and membrane or PEM 138, as will be understood by those skilled in the art. For instance, one can cut a slot out of the PEM for this metering area. Further, one can slice holes through the PEM for formation of the fluid manifolds. Otherwise, the PEM is preferably coextensive with fluid flow plate 120, with a gas diffusion layer (not shown) positioned between active areas of the PEM and the fluid flow plate.

Furthermore, transverse channel 134 has one transverse extent bounded by cover plate 128 and an opposite transverse extent bounded by an adjacent layer 118. Input orifice 132 of the cover plate provides fluid communication between the transverse channel and an input channel 140. The input channel provides fluid communication with a fluid manifold, which preferably supplies hydration water thereinto.

The present invention preferably employs orifice metering in order to individually and directly inject substantially equal amounts of liquid water into each fluid flow plate inlet 126 in various faces 122 throughout fuel cell assembly 100. For instance, through selection of relative sizes between input orifice 132 and injection ports 131, one can hydraulically meter direct liquid water injection into the reactant fluid/gas streams supplied to the inlets of flow channels 124 from a given fluid manifold 150.

Successful operation of a PEM-type fuel cell requires continuous and widespread hydration of its PEM 138. Preferably, injection ports 131 serve as atomizers that stream fine liquid water particles for mixing into the reactant gas flow existing in each flow channel 124.

Optionally, one can position porous block 142 in transverse channel 134 in order to enhance the metering of the liquid water into inlets 126. The porous block may act as a filter and/or restrictor for the distribution of liquid water to flow channels 124. For instance, the porous block might be formed from a porous plastic material, a sintered metal material, or a tightly-woven fabric material.

By injecting water directly at each inlet 126 of flow channels 124, which together preferably provide an electrochemical interface for all active portions of PEM 138 through a gas diffusion layer (not shown), one ensures that no section of the PEM in a given fuel cell ever dries out. This prevents the previous problem of dryness progressively marching across the PEM until the fuel cell fails. Indeed, the fuel cell generates its own product water for self-hydration when it does not dry out. Downstream of the inlet, any succeeding turns in the flow channel and consequent separation of water from the gas therein are not problematic because the water must remain in that flow channel all the way until it exits out outlet 127 (FIG. 2) from the flow channel and into a discharge fluid manifold. In particular, there is no opportunity for the water to migrate to another portion of the assembly 100 before this exit.

That is, pressure carries the resultant mixture of liquid water and gas reactant through each flow channel 124 for wetting of the corresponding PEM 138 and exiting from outlet 127 (FIG. 2) and into a corresponding discharge manifold for that reactant. So, PEM 138 will not have areas that are either flooded or starved.

Where fluid flow plate 120 is a bipolar plate, an opposite face 122' (not shown) similarly can have a metering area 130' positioned approximately at inlets 126' of flow channels 124', as will be understood by those skilled in the art. For instance, a repetition of the machining pattern depicted on the face in FIG. 2 on the opposite face of that same fluid flow plate desirably would provide a metering area at a consecutive corner of the plate, which would allow convenient connection to another fluid manifold for supply of an appropriate reactant fluid.

At metering area 130, the direct injection of liquid water at inlet 126 of each flow channel 124 in a given fuel cell carries to PEM 138 more water, and thereby yields more output from the fuel cell, than is possible using conventional humidification of reactant gas. By forming the metering area at face 122 on each fluid flow plate that carries reactant gas, one can advantageously distribute liquid water substantially uniformly along multiple flow channels of a given plate, as well as in multiple fluid flow plates throughout fuel cell assembly 100. Desirably, one thereby obtains a fuel cell assembly whose output becomes much easier to maintain because of the assurance all the fuel cells receive all the water they can use.

In a fuel cell assembly having a relatively large number of fuel cells, the injection system must be desensitized from differences in injection pressures in order to maintain substantially equal amounts of flow through injection ports 131. For instance, these differences in injection pressures can result from changes in attitude of the fuel cell assembly. For example, if it is desired to limit the injection pressure variation in metering area 130 to plus or minus ten percent, one preferably sizes input orifice 132 so that the pressure drop thereacross is ten times the pressure differential likely to result from changes in physical attitude of the fuel cell assembly. That is, one preferably sizes the injection ports to provide differential pressure thereacross sufficient to cause the pressure in transverse channel 134 to overwhelm physical effects such as capillarity.

Figure 4:
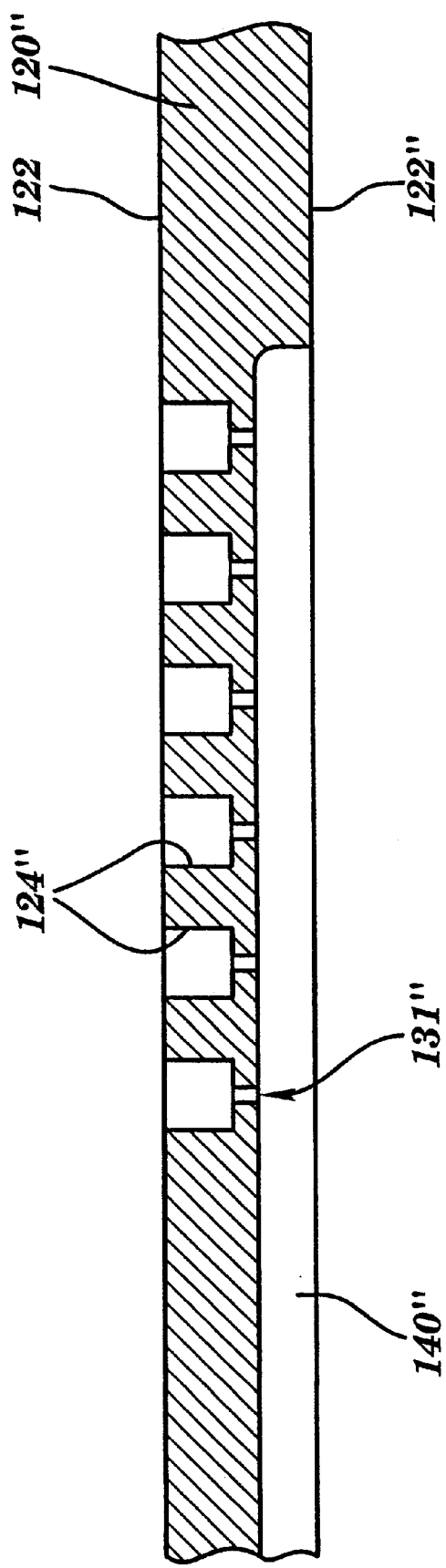
FIG. 4 is a cutaway side view of another example of a fuel cell fluid flow plate, in accordance with the present invention.

As depicted in FIG. 4, another example forms input channel 140" on a face 122" of fuel cell fluid flow plate 120" opposite to face 122 on which flow channels 124" are formed, in accordance with the present invention. Injection ports 131" are then provided which pass through the bottom of the flow channels for fluid communication with the input channel.

As will be understood by those skilled in the art, one can relatively size input orifice 132 and injection ports 131 in order to substantially remove the effects of any existing or anticipated transverse height differential in an individual fuel cell. Similarly, one can size the input orifices and injection ports on cover plate 128 for each one of multiple fluid flow plates 120 in fuel cell assembly 100 in order to substantially remove the effects of any existing or anticipated longitudinal height differential. By appropriately sizing the ports and orifice(s) in order to desensitize fuel cell performance from moderate variations in fuel cell attitude or position, one can simplify fuel cell system control.

For example, one can decide to equalize liquid water flow among a number of channels 124 within a selected percentage. Such a selection consequently determines approximately how much pressure drop one needs across input orifice 132 and injection ports 131, taking into account a reasonable amount of geometric distortion which may result from movement of the fuel cells.

For instance, one can evaluate the physical size and expected application (e.g., whether vehicular or static) for a given fuel cell assembly 100. Next, one can generate test data by running the fuel cell assembly. Analysis of the test data will show what performance improvement will result from injecting a certain amount of liquid water into any particular flow channel 124. On that basis, one can decide how much additional water one wants to add to a given flow channel.

Numerous alternative embodiments of the present invention exist. For example, metering area 130 could easily be positioned upstream or downstream of inlets 126. Thus, one or more injection ports 131 could easily inject liquid water for mixing with respective portions of the reactant fluid streams just upstream of inlets 126. Alternatively, one or more injection ports 131 could easily inject liquid water into one or more flow channels 124 at a position somewhat downstream of inlets 126. Moreover, any desired number of fluid flow plates 120 in a given fuel cell assembly 100 could easily include metering area 130 of the present invention. Also, metering area 130 could easily be employed in a given fuel cell assembly 100 with another liquid besides, or in addition to, water. Of course, any injection port 131 and/or input orifice 132 can have any desired shape and/or size. Additionally, working section 114 could easily include cooler plates and/or fuel cells other than PEM-type fuel cells.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A fuel cell fluid flow plate, comprising
   a first exterior face portion including a flow channel with an inlet for receiving a portion of a steam of fluid for a fuel cell; and
   a second exterior face portion, said first and second exterior face portions generally directed in opposite directions;
   said plate including an opening for injecting a portion of liquid into said portion of said stream, said opening extending between said inlet and said second exterior face portion, and said second exterior face portion comprising a passage for conveying said portion of liquid to said opening.

2. The plate of claim 1, wherein said liquid comprises liquid water, and wherein said injecting serves to hydrate at least a part of a membrane of said fuel cell.

3. The plate of claim 1 in combination with a metering system, wherein said opening comprises a flow regulator for metering said injecting of said portion of liquid into said portion of said stream.

4. The combined plate and system of claim 3, wherein said flow regulator employs orifice metering.

5. A fuel cell fluid flow plate, comprising:
   a first exterior face portion including a flow channel with an inlet for receiving a portion of a stream of fluid for a fuel cell; and a second exterior face portion, said first and second exterior face portions generally directed in opposite directions;

said plate including an opening for injecting a portion of liquid into said portion of said stream, said opening extending between said inlet and said second exterior face portion, and wherein said first exterior face portion includes a plurality of flow channels with respective inlets for receiving respective portions of said stream, said plate further includes a plurality of respective openings for injecting respective portions of said liquid into said respective portions of said stream, said openings extending between said inlets and said second exterior face portion.

6. The plate of claim 5 in combination with a metering system, wherein said openings comprise a flow regulator for metering said injecting of said respective portions of said liquid into said respective portions of said stream.

7. The combined plate and system of claim 6, wherein said flow regulator employs orifice metering.

8. The combined plate and system of claim 6, wherein said flow regulator also serves to meter said respective portions of said liquid to be substantially equal in amount.

9. The combined plate and system of claim 6, wherein said liquid comprises liquid water, and wherein said metering of said injecting of said respective portions of said liquid water serves to hydrate at least respective parts of a membrane of said fuel cell.

* * * * *